(12) United States Patent
Chiu

(10) Patent No.: US 8,388,288 B2
(45) Date of Patent: Mar. 5, 2013

(54) CAPTIVE SCREW

(75) Inventor: Ming-Chung Chiu, Hsichih (TW)

(73) Assignee: TechMech Technologies Corp., Taipei Hsien (TW)

( * ) Notice: Subject to any disclaimer, the term of this patent is extended or adjusted under 35 U.S.C. 154(b) by 298 days.

(21) Appl. No.: 12/875,715

(22) Filed: Sep. 3, 2010

(65) Prior Publication Data

US 2012/0057947 A1  Mar. 8, 2012

(51) Int. Cl.
*F16B 23/00* (2006.01)

(52) U.S. Cl. .......................... 411/107; 411/903; 411/377

(58) Field of Classification Search .................. 411/107, 411/353, 396, 903, 352, 377
See application file for complete search history.

(56) References Cited

U.S. PATENT DOCUMENTS

| | | | | |
|---|---|---|---|---|
| 3,245,450 A | * | 4/1966 | Sauter | 411/349 |
| D388,316 S | * | 12/1997 | McDonough et al. | D8/387 |
| 5,851,095 A | * | 12/1998 | Ellis et al. | 411/353 |
| 6,033,168 A | * | 3/2000 | Creely et al. | 411/107 |
| 6,394,724 B1 | * | 5/2002 | Kelly et al. | 411/353 |
| 6,814,530 B2 | * | 11/2004 | Franco et al. | 411/353 |
| 8,087,861 B2 | * | 1/2012 | Wang | 411/107 |

* cited by examiner

*Primary Examiner* — Flemming Saether
(74) *Attorney, Agent, or Firm* — Muncy, Geissler, Olds & Lowe, PLLC

(57) ABSTRACT

A captive screw formed of a lock screw, a cap-shaped knob, a spring member and a mounting barrel and mountable in a mounting through hole of a first panel frame and fastenable to a mounting screw hole of a second panel frame to detachably secure the second panel frame to the first panel frame is disclosed. The lock screw has a top protrusion raised from the top wall of the head thereof and a tool groove formed in the top protrusion. The cap-shaped knob is molded on the head of the lock screw by insert molding and defining an endless isolation groove on the top wall of the head of the lock screw around the periphery of the top protrusion that facilitates attachment of a hand tool to the top protrusion of the lock screw for enabling the lock screw to be driven by the user with the hand tool into the mounting screw hole of the second panel frame conveniently with less effort.

2 Claims, 8 Drawing Sheets

CAPTIVE SCREW

BACKGROUND OF THE INVENTION

1. Field of the Invention

The present invention relates to fastener means for joining two metal panel frames and more particularly, to a captive screw, which has an endless isolation groove defined on the top wall of the head of the lock screw within the cap-shaped knob around the top protrusion of the lock screw, facilitating attachment of a hand tool to the top protrusion of the lock screw so that the lock screw can be driven by the user conveniently with the hand tool into a mounting screw hole of a second panel frame to lock the second panel frame to a first panel frame that carries the captive screw.

2. Description of the Related Art

When fastening panel frames together, a fastening screw assembly formed of a knob, a barrel and a screw is usually used. During installation, the screw and the barrel are secured to the first panel frame, and then the knob is rotated to drive the screw into the second panel frame, and then a hand tool is used to fasten tight the screw, affixing the first and second panel frames together. This design of fastening screw assembly can be used in a machine tool to join panel frames together. In a machine tool where panel frames are to be fastened together are the locations of the power drive and speed-adjustment unit. Further, the power drive and speed-adjustment unit of a machine toll are common arranged inside a housing. When the power drive or speed-adjustment unit fails, or when an adjustment of the speed of the power drive or speed-adjustment unit is necessary, the panel frames must be unlocked. When unlocked the panel frames, the component parts of the fastening screw assembly may fall from the panel frames and missed accidentally, affecting further re-installation operation.

To facilitate detachable installation of panel frames and to avoid missing of component parts, captive screws are developed. Conventional captive screws are commonly formed of a cap member, a screw, a spring member and a mounting barrel. During application, the mounting barrel is affixed to a mounting through hole on a first panel frame to hold the screw, the spring member and the cap member in place, allowing the screw to be detachably driven into a mounting screw hole on a second panel frame to detachably lock the second panel frame to the first panel frame. These captive screws prevent falling of component parts from the first panel frame after separation of the first panel frame from the second panel frame.

As shown in FIGS. 7 and 8, the lock screw A1 of the fastening device A has a head A11 of a lock screw A1, a threaded shank A12 located on the bottom side of the head A11, a top protrusion A13 raised from the top wall of the head A11, an embossment A111 located on the periphery of the head A11 and a tool groove A131 located on the top side of the top protrusion A13. The knob A14 of the fastening device A is directly molded from a plastic material on the periphery of the head A11. The knob A14 defines therein an accommodation space A141 around the lock screw A1 for accommodating the mounting barrel B and spring member C of the captive screw. The spring member C is sleeved onto the threaded shank A12 of the lock screw A1 and stopped between the head A11 of the lock screw A1 and a step in an inside space B1 of the mounting barrel B. When assembled, the knob A14 is axially slidably coupled to the mounting barrel B, avoiding falling of the lock screw A1 and the spring member C out of the mounting barrel B. However, this prior art design still has drawbacks as follows:

1. The knob A14 of the fastening device A is directly molded from a plastic material on the periphery of the head A11 of the lock screw A1. During molding of the knob A14 on the head A11 of the lock screw A1, the molten plastic material may flow to the tool groove A131, causing the tool groove A131 to be fully or partially clogged with the plastic material. If the tool groove A131 is clogged, rotating the fastening device A with a hand tool will be difficult or not possible, and the captive screw will become a defective product.
2. The top protrusion A13 of the lock screw A1 can simply be processed to provide a crossed tool groove A131. If the top protrusion A13 of the lock screw A1 is processed to provide a straight tool groove, the molding plastic material may flow to the straight tool groove easily during molding of a knob on the head of the lock screw. Thus, the design of the tool groove is limited, not able to facilitate in-situ installation.

Therefore, it is desirable to provide a captive screw design that facilitates fabrication and, prevents overflow of the applied molten plastic material during molding of the knob on the head of the lock screw.

SUMMARY OF THE INVENTION

The present invention has been accomplished under the circumstances in view. It is therefore an object of the present invention to provide a captive screw design, which facilitates fabrication of captive screw, preventing overflow of the applied molten material during molding of the cap-shaped knob on the head of the lock screw. It is another object of the present invention to provide a captive screw, which facilitates attachment of a hand tool to the top protrusion of the lock screw, enabling the lock screw to be driven by the user with the hand tool into a mounting screw hole of a second panel frame to lock the second panel frame to a first panel frame that carries the captive screw.

To achieve these and other objects of the present invention, a captive screw comprises a mounting barrel affixed to a mounting through hole of a first panel frame and defining therein an inside step, a lock screw inserted into the mounting barrel and fastenable to a mounting screw hole of a second panel frame to lock the second panel frame and the first panel frame together and having a threaded shank located on the bottom side of the head thereof and a top protrusion located on the top side of the head, a spring member sleeved onto the threaded shank of the lock screw and stopped between the head of the lock screw and the inside step of the mounting barrel and a cap-shaped knob molded on the head of the lock screw by insert molding and axially slidably coupled to the mounting barrel. The cap-shaped knob defines an endless isolation groove on the top wall of the head of the lock screw around the periphery of the top protrusion of the lock screw. The endless isolation groove facilitates attachment of a hand tool to the top protrusion of the lock screw for enabling the lock screw to be driven by the user with the hand tool into the mounting screw hole of the second panel frame conveniently with less effort.

Further, the lock screw has a keystone groove, crossed groove, hexagonal groove, polygonal groove, keystone rib, crossed rib, hexagonal rib or polygonal rib located on the top protrusion for the positioning of a hand tool so that the user can drive the lock screw into the mounting screw hole of the second panel frame with a hand tool conveniently with less effort.

Further, the cap-shaped knob is made from plastics, rubber or acrylic and molded on the head of the lock screw in a mold by insert molding. The mold is formed of an upper die and a bottom die. When the upper die is closed on the bottom die after loading of the lock screw in the bottom die, an annular rib of the upper die is pressed on the top wall of the head of the lock screw around the top protrusion to isolate the top protrusion of the lock screw from the molding chamber, prohibiting overflow of the applied molten material into the tool groove in the top protrusion of the lock screw. After molding of the cap-shaped knob on the head of the lock screw, the desired endless isolation groove is formed in the top side of the cap-shaped knob on the top wall of the head of the lock screw around the top protrusion corresponding to the location of the annular rib of the upper die.

DETAILED DESCRIPTION OF THE PREFERRED EMBODIMENT

Figure 1:
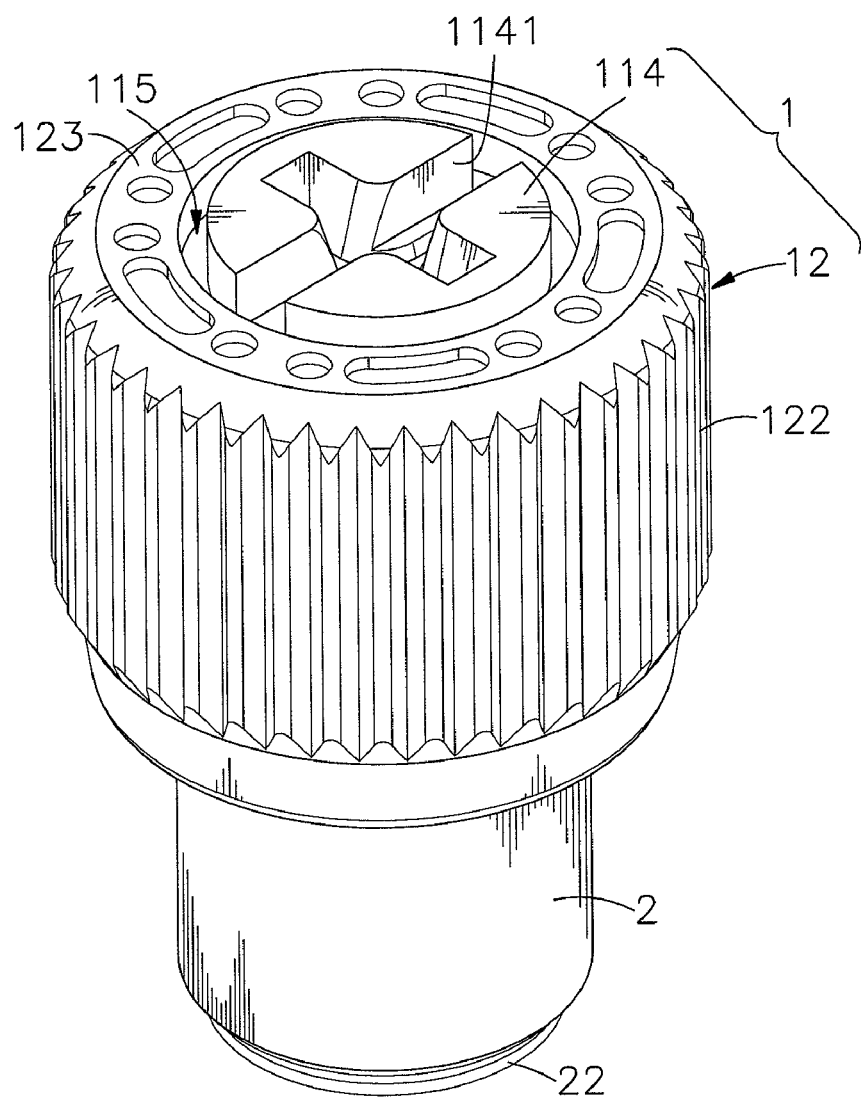
FIG. 1 is an elevational view of a captive screw in accordance with the present invention.
Figure 2:
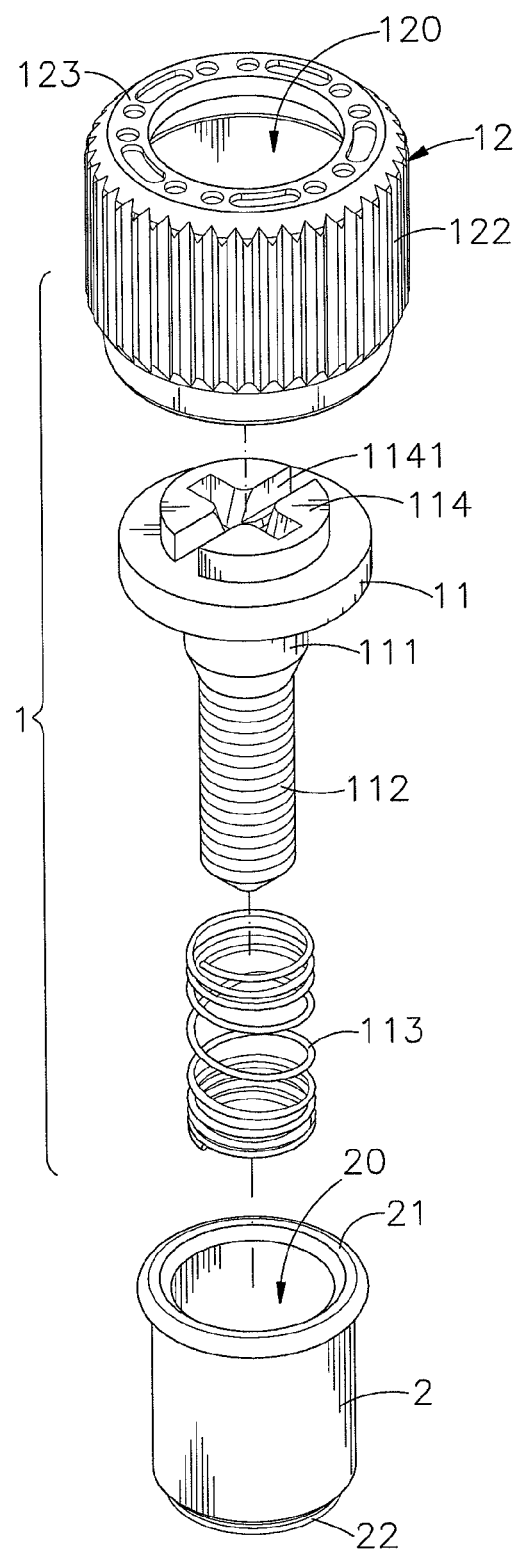
FIG. 2 is an exploded view of the captive screw in accordance with the present invention.
Figure 3:
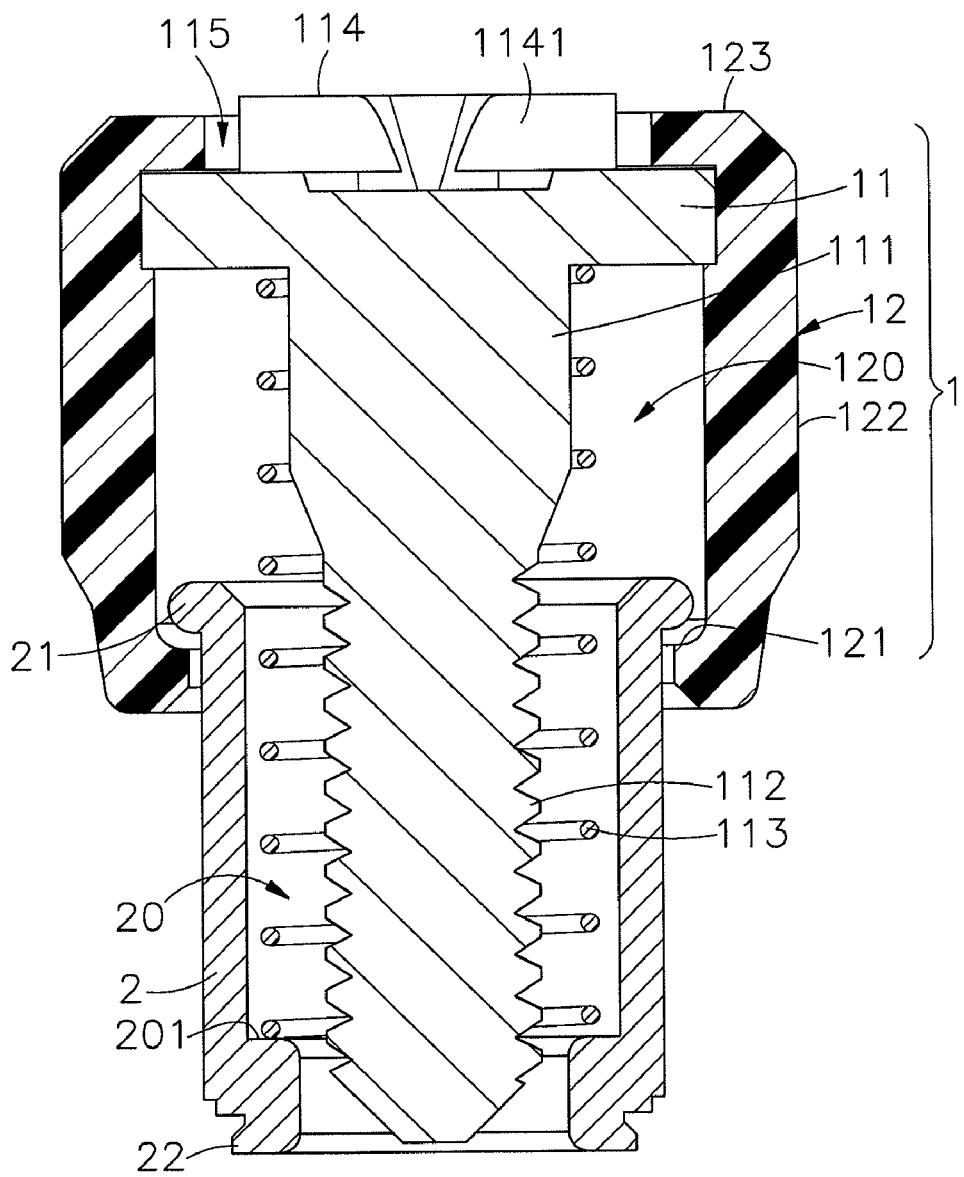
FIG. 3 is a sectional side view of the captive screw in accordance with the present invention.

Referring to FIGS. 1-3, a captive screw in accordance with the present invention comprises a fastening device 1 and a mounting barrel 2.

The fastening device 1 comprises a lock screw 111, a spring member 113 and a cap-shaped knob 12. The lock screw 111 has a head 11, a threaded shank 112 located on the bottom side of the head 11, a top protrusion 114 raised from the top wall of the head 11 and a tool groove 1141 formed in the top protrusion 114. The spring member 113 is, for example, but not limited to, a compression spring sleeved onto the threaded shank 112 of the lock screw 111. The cap-shaped knob 12 is shaped like a cap and directly molded on the head 11 of the lock screw 111 by insert molding. After formation of the cap-shaped knob 12 on the head 11 of the lock screw 111, an endless isolation groove 115 is defined on the top wall of the head 11 between the cap-shaped knob 12 and the periphery of the top protrusion 114, and a receiving space 120 is defined inside of the cap-shaped knob 12 around the lock screw 111. Further, the cap-shaped knob 12 has a bottom coupling flange 121 suspending in the bottom side of the receiving space 120.

The mounting barrel 2 has a center hole 20 extending through the top and bottom ends thereof, a top stop flange 21 extending around the periphery of the top end thereof, a contracted bottom mounting portion 22 axially extended from the bottom end thereof and an inside step 201 extending around the inside wall thereof inside the center hole 20.

During the assembly process of the captive screw, sleeve the spring member 113 onto the threaded shank 112 of the lock screw 111, and then insert the spring member 113 with the threaded shank 112 of the lock screw 111 into the center hole 20 of the mounting barrel 2 to force the top stop flange 21 of the mounting barrel 2 over the bottom coupling flange 121 into the receiving space 120 inside of the cap-shaped knob 12, enabling the mounting barrel 2 to be coupled to the cap-shaped knob 12 and axially movable relative to the cap-shaped knob 12 and the spring member 113 to be stopped between the head 11 of the lock screw 111 and the inside step 201 in the center hole 20 of the mounting barrel 2. Further, the elastic material property of the cap-shaped knob 12 enables the cap-shaped knob 12 to be elastically deformed for allowing the top stop flange 21 of the mounting barrel 2 to be moved over the bottom coupling flange 121 into the receiving space 120 inside of the cap-shaped knob 12. After the top stop flange 21 of the mounting barrel 2 is moved into the receiving space 120 inside of the cap-shaped knob 12, the elastically deformed cap-shaped knob 12 immediately returns to its former shape, the bottom coupling flange 121, thus the top stop flange 21 of the mounting barrel 2 is stopped inside the receiving space 120 of the cap-shaped knob 12 by the bottom coupling flange 121.

Further, the endless isolation groove 115 defined on the top wall of the head 11 around the periphery of the top protrusion 114 avoids overflow of the molten plastic material to the tool groove 1141 of the top protrusion 114 during molding of the cap-shaped knob 12 on the head 11 of the lock screw 111. Therefore, the tool groove 1141 is kept clean after molding of the cap-shaped knob 12 on the head 11 of the lock screw 111. Further, the tool groove 1141 of the lock screw 111 can be a keystone groove, crossed groove, hexagonal groove, or polygonal groove for the positioning of a keystone tip screwdriver, Phillips tip screwdriver, hexagonal wrench, open-end wrench, socket wrench, or ratchet wrench. In case of a keystone groove, it extends through two opposing sides of the periphery of the top protrusion 114. Further, instead of the aforesaid keystone groove, crossed groove, hexagonal groove or key groove, a keystone rib, crossed rib, hexagonal rib or key rib may be made on and raised from the top wall of the top protrusion 114 to fit a respective matching wrench tool. Further, instead of plastics, the cap-shaped knob 12 may be prepared from another of a variety of other insulative materials, such as rubber or acrylic. Further, the cap-shaped knob 12 has an embossed pattern 122 standing out on the periphery thereof to enhance hand grip friction. The embossed pattern 122 can be a series of V-shaped, U-shaped, N-shaped or S-shaped teeth or corrugations spaced around the periphery of the cap-shaped knob 12, or an array of raised portions of any shape evenly distributed over the periphery of the cap-shaped 12. Further, the cap-shaped knob 12 has a decorative design 123 located on the top wall thereof around the top protrusion 114 of the lock screw 111. The decorative design 123 can be formed of recessed portions and/or raised portions of different shapes and sizes, for example, but not limited to, circular recesses and/or raised portions, oval recesses and/or raised portions, or oblong recesses and/or raised portions.

Figure 4:
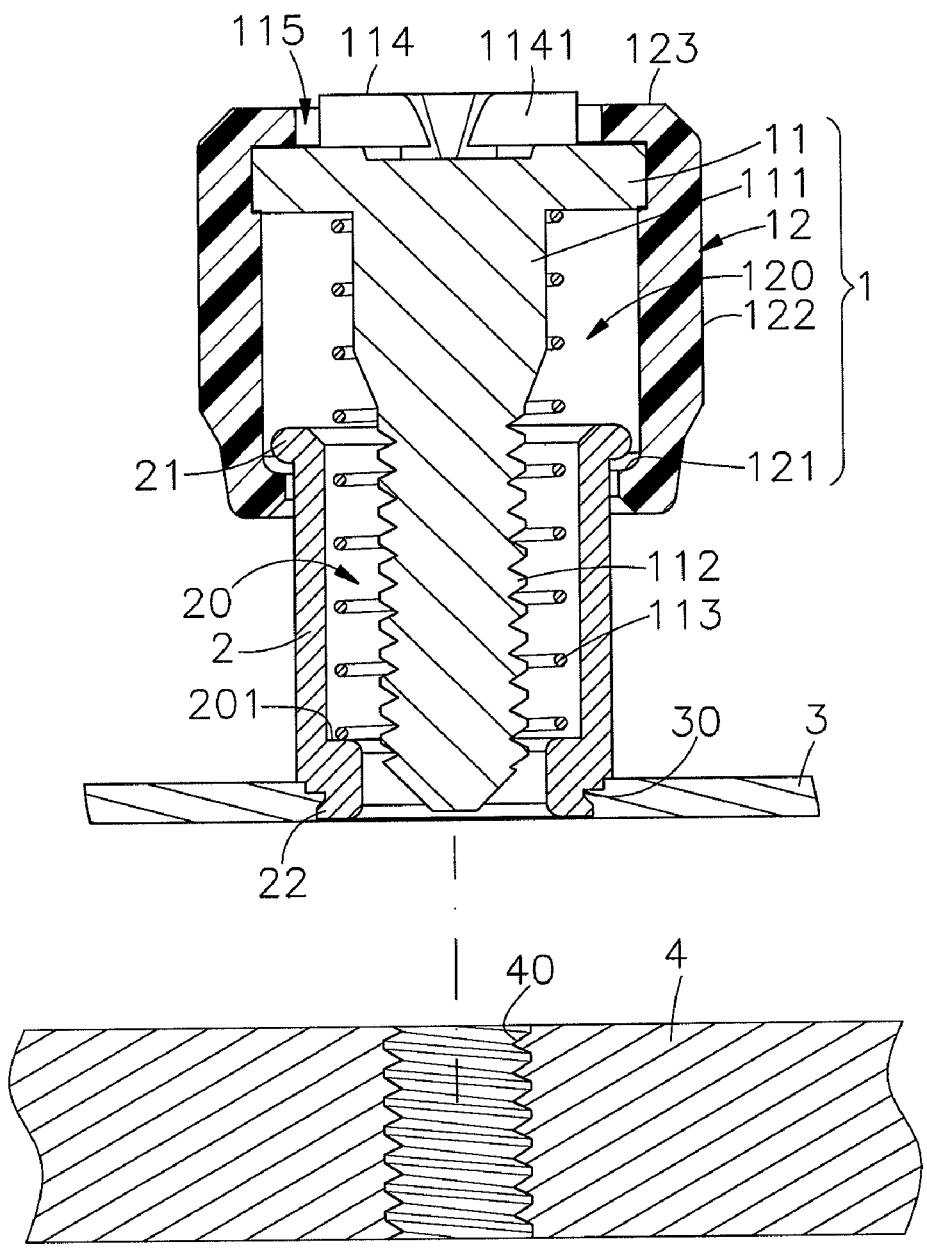
FIG. 4 is a schematic sectional side view, showing an application example of the captive screw according to the present invention.

Referring to FIG. 4 and FIGS. 2 and 3 again, during application of the captive screw, fixedly fasten the contracted bottom mounting portion 22 of the mounting barrel 2 to a mounting through hole 30 of a first panel frame 3, thus, the captive screw is secured to the first panel frame 3. When the first panel frame 3 is attached to a second panel frame 4, force down the knob 12 to attach the front end of the threaded shank 112 of the lock screw 111 to a mounting screw hole 40 on the second panel frame 4, and then rotate the knob 12 to drive the threaded shank 112 of the lock screw 111 into the mounting screw hole 40 of the second panel frame 4. Further, by means of attaching a hand tool to the tool groove 1141, the lock screw 111 can be driven into the mounting screw hole 40 of the second panel frame 4 with the hand tool tightly with less effort, thereby locking the first panel frame 3 and the second panel frame 4 together.

Figure 5:
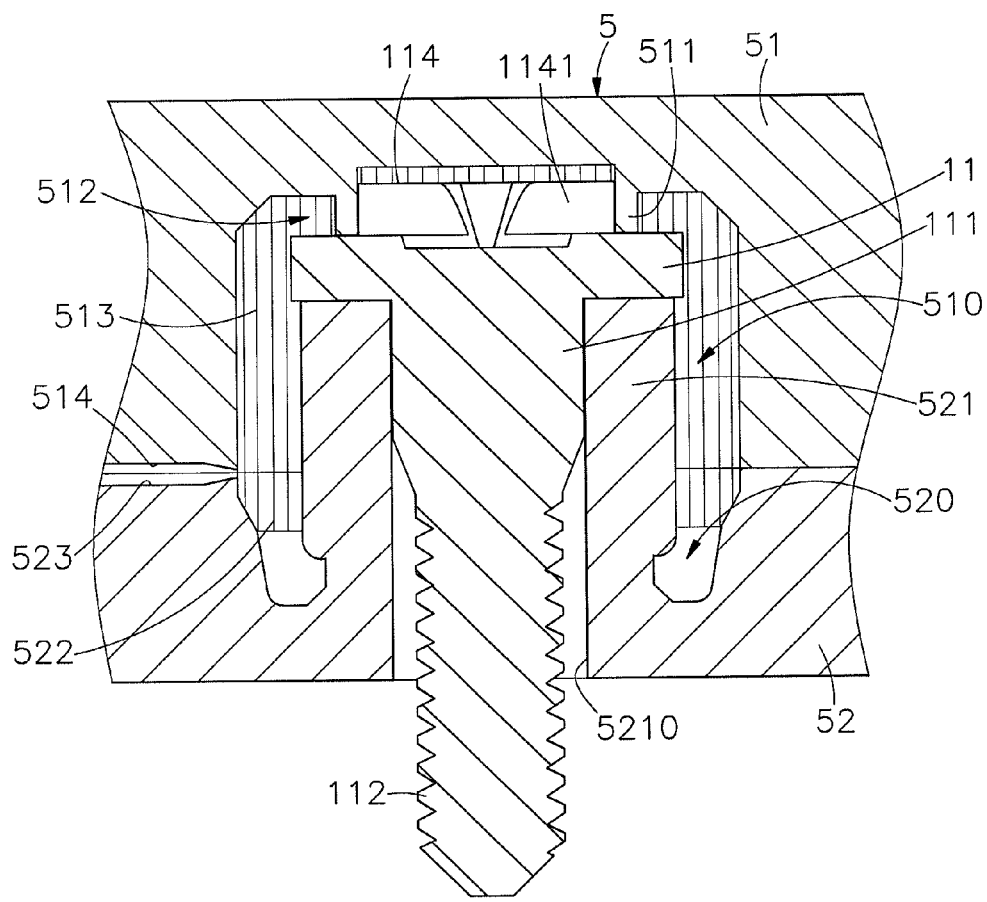
FIG. 5 is a schematic sectional view, showing the lock screw loaded in a mold before molding of the cap-shaped knob according to the present invention.
Figure 6:
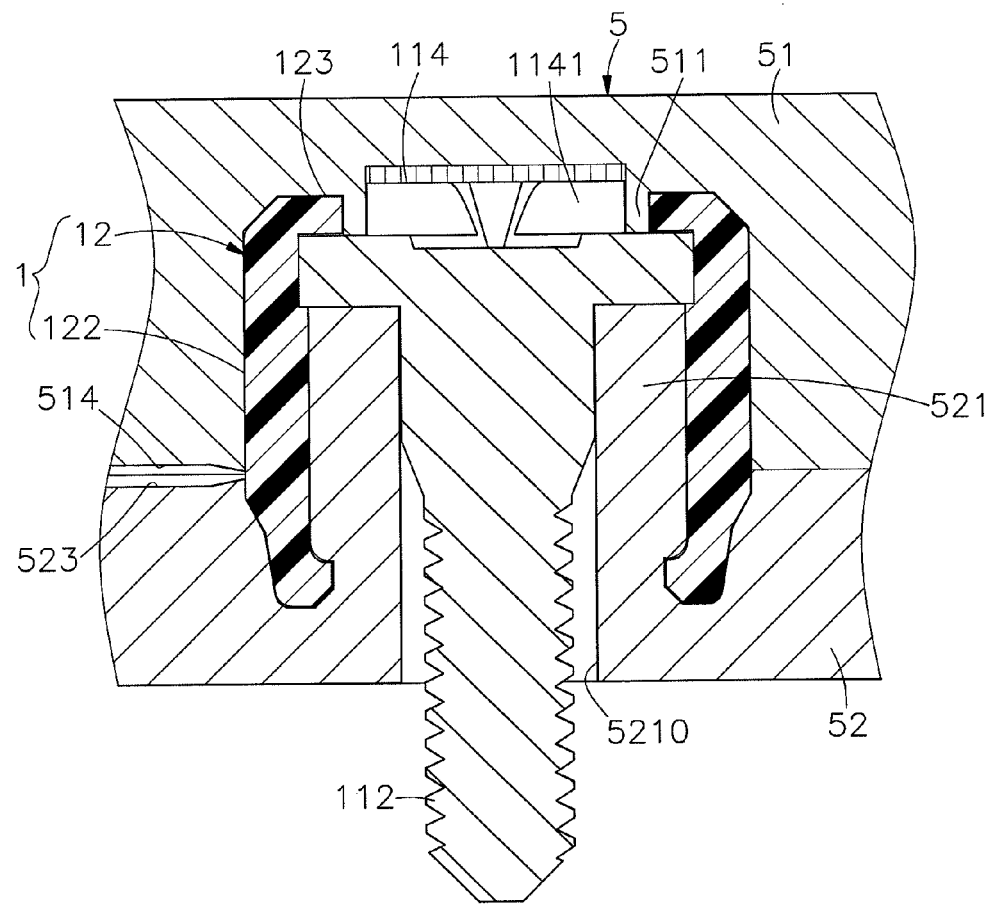
FIG. 6 corresponds to FIG. 5, showing the desired cap-shaped knob molded on the head of the lock screw.
Figure 7:
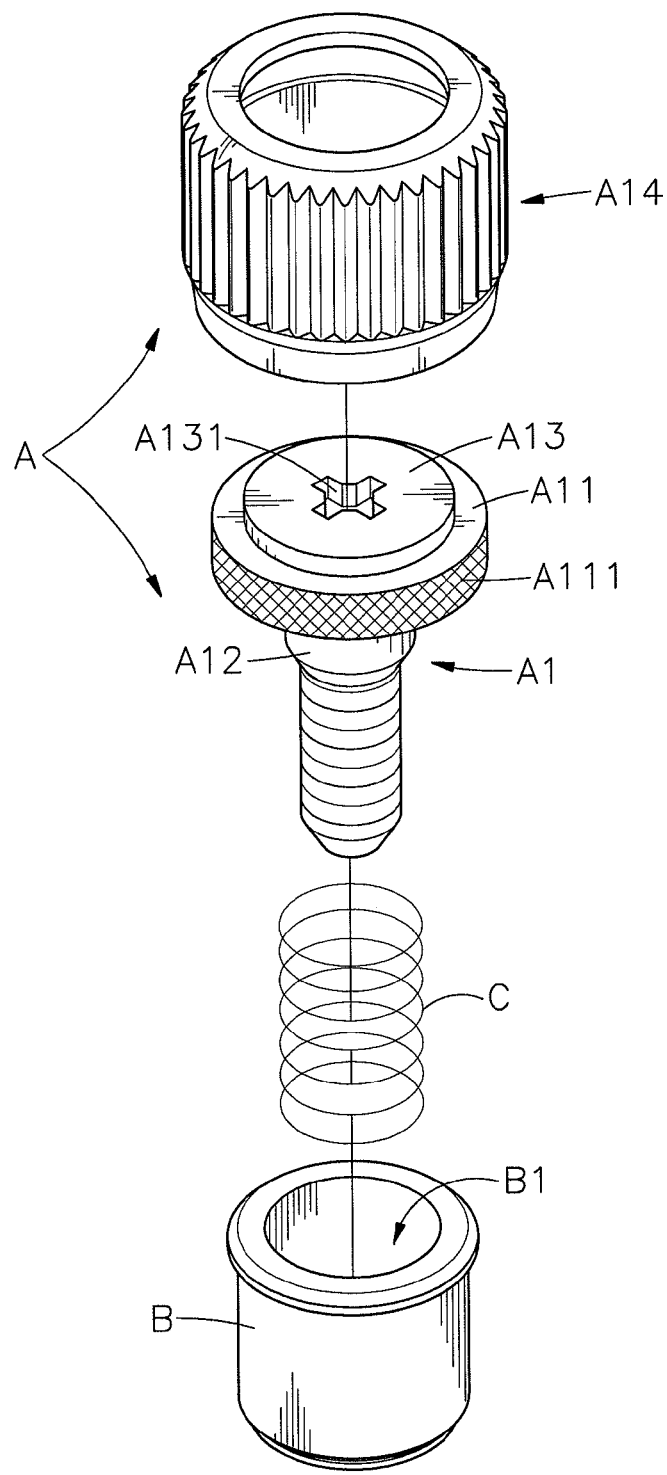
FIG. 7 is an exploded view of a captive screw according to the prior art.
Figure 8:
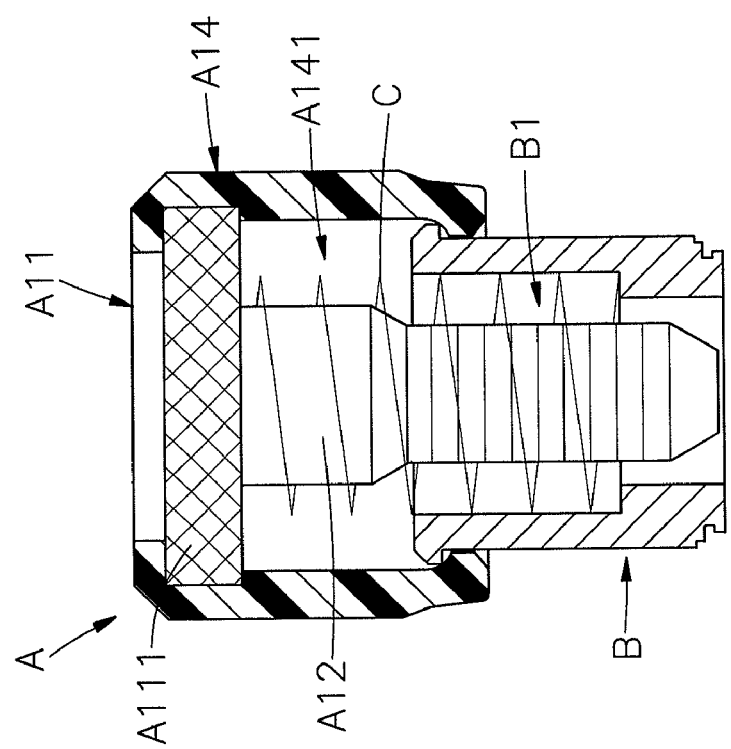
FIG. 8 is a sectional side view of the captive screw according to the prior art.

Referring to FIGS. 5 and 6 and FIGS. 2 and 3 again, the cap-shaped knob 12 is directly molded on the head 11 of the lock screw 111 by means of a mold 5, which comprises an upper die 51 with an upper die cavity 510 defined therein, and a bottom die 52 with a bottom die cavity 520 defined therein. During molding, the threaded shank 112 of the lock screw 111 is inserted into a vertical through hole 5210 in a base 521 in the bottom die cavity 520 of the bottom die 52 to let the head 11 of the lock screw 111 be rested on the topmost edge of the base 521, and then the upper die 51 is closed on the bottom die 52 to press an annular rib 511 in the upper die cavity 510 on the top wall of the head 11 of the lock screw 111 around the top protrusion 114, thereby isolating the top protrusion 114 from the upper die cavity 510. At this time, a molding chamber 512 is defined in the upper die cavity 510 around the head 11 of the lock screw 111. Further, teeth 513;522 are located on the outside wall of the upper die cavity 510 and the inside wall of the bottom die cavity 520; an upper filling groove 514 and a bottom filling groove 523 are respectively located on the bottom wall of the upper die 51 and the top wall of the bottom die 52 in communication with the molding chamber 512 for guiding the applied molten material (plastics, rubber or acrylic) into the molding chamber 512 to mold the desired cap-shaped knob 12 on the head 11 of the lock screw 111 by insert molding. By means of the teeth 513;522, the desired decorative design 123 and embossed pattern 122 are formed on the top wall and periphery of the cap-shaped knob 12 after the molding process is done. Further, when molding the cap-shaped knob 12 on the head 11 of the lock screw 111, the applied molten material is kept in the molding chamber 512 and prohibited by the annular rib 511 from flowing to the tool groove 1141 of the top protrusion 114 of the lock screw 111. After molding of the cap-shaped knob 12 on the head 11 of the lock screw 111, an endless isolation groove 115 is defined on the top side of the head 11 of the lock screw 111 between the top protrusion 114 and the cap-shaped knob 12 corresponding to the annular rib 511. Thus, during installation of the captive screw, a user can insert a tool into the tool groove 1141 in the top protrusion 114 of the lock screw 111 accurately without touching the cap-shaped knob 12, facilitating operation of the attached tool.

The aforesaid embodiment is simply an exemplar of the present invention and not intended as limitations. By means of molding the cap-shaped knob 12 on the head 11 of the lock screw 111 by insert molding to keep an endless isolation groove 115 on the top side of the head 11 of the lock screw 111 around the top protrusion 114, the tool groove 1141 of the top protrusion 114 is kept clean and will not be clogged with the molten material during the molding process. Thus, during application of the finished captive screw, a user can insert a hand tool into the tool groove 1141 in the top protrusion 114 of the lock screw 111 accurately without touching the cap-shaped knob 12, facilitating operation of the attached hand tool to drive the lock screw 111 accurately into position with less effort.

In conclusion, the captive screw of the present invention has the following advantages and features:

1. The cap-shaped knob 12 is directly molded on the head 11 of the lock screw 111 by insert molding with an endless isolation groove 115 left on the top side of the head 11 of the lock screw 111 around the top protrusion 114, so that the tool groove 1141 of the top protrusion 114 is kept clean after the molding process is done. Thus, a user can attach a hand tool to the tool groove 1141 in the top protrusion 114 of the lock screw 111 and rotate the lock screw 111 with the hand tool positively to have the lock screw 111 be accurately driven into the workpiece with less effort.

2. The top protrusion 114 of the lock screw 111 is made having a tool groove 1141 configured to fit a keystone tip screwdriver, Phillips tip screwdriver, hexagonal wrench, open-end wrench, socket wrench or ratchet wrench. Further, an endless isolation groove 115 is defined on the top side of the head 11 of the lock screw 111 between the top protrusion 114 and the molded cap-shaped knob 12, facilitating the application of a hand tool to drive the lock screw 111 into the workpiece.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A captive screw installed in a mounting through hole of a first panel frame and adapted and detachably fastenable to a mounting screw hole of a second panel frame to lock said second panel frame to said first panel frame, the captive screw comprising:
   a mounting barrel, said mounting barrel comprising a center hole extending through top and bottom ends thereof, a top stop flange extending around the periphery of the top end thereof, a contracted bottom mounting portion axially extended from the bottom end thereof and affixed to the mounting through hole of said first panel frame and an inside step extending around an inside wall thereof inside said center hole;
   a lock screw insertable through the center hole of said mounting barrel and detachably fastenable to the mounting screw hole of said second panel frame to lock said second panel frame to said first panel frame, said lock screw comprising a head having opposing top and bottom walls, a threaded shank extended from the bottom wall of said head for fastening to the mounting screw hole of said second panel frame, and a top protrusion raised from the top wall of said head for the positioning of a hand tool to be operated to drive said lock screw into the mounting screw hole of said second panel frame;
   a cap-shaped knob molded on the head of said lock screw by insert molding and defining therein a receiving space around said threaded shank of said lock screw and an endless isolation groove on the top wall of said head of said lock screw around the periphery of said top protrusion, said cap-shaped knob comprising a bottom coupling flange suspending in a bottom side of said receiving space and axially slidably coupled to the periphery of said mounting barrel and stoppable at a bottom side of said top stop flange of said mounting barrel; and
   a spring member sleeved onto said threaded shank of said lock screw and stopped between the bottom wall of said head of said lock screw and the inside step of said mounting barrel,
   wherein said cap-shaped knob is made from an insulative material, having an embossed pattern located on the periphery thereof in the form of a series of V-shaped, U-shaped, N-shaped or S-shaped teeth or an array of raised portions,
   wherein said insulative material is selected from the group consisting of plastics, rubber and acrylic; said cap-shaped knob further comprises a decorative design located on a top wall thereof around said top protrusion of said lock screw, said decorative design comprising a plurality of recessed portions and/or raised portions.

2. The captive screw as claimed in claim 1, wherein said lock screw further comprises a hand tool positioning means in one of the forms of keystone groove, crossed groove, hexagonal groove, polygonal groove, keystone rib, crossed rib, hexagonal rib and polygonal rib for the positioning of a hand tool rotatable to drive said lock screw into said mounting screw hole of said second panel frame.

* * * * *